T. S. GRIMES.
COTTON CONDENSER.
APPLICATION FILED JUNE 20, 1911.
1,081,111.
Patented Dec. 9, 1913.
2 SHEETS—SHEET 1.
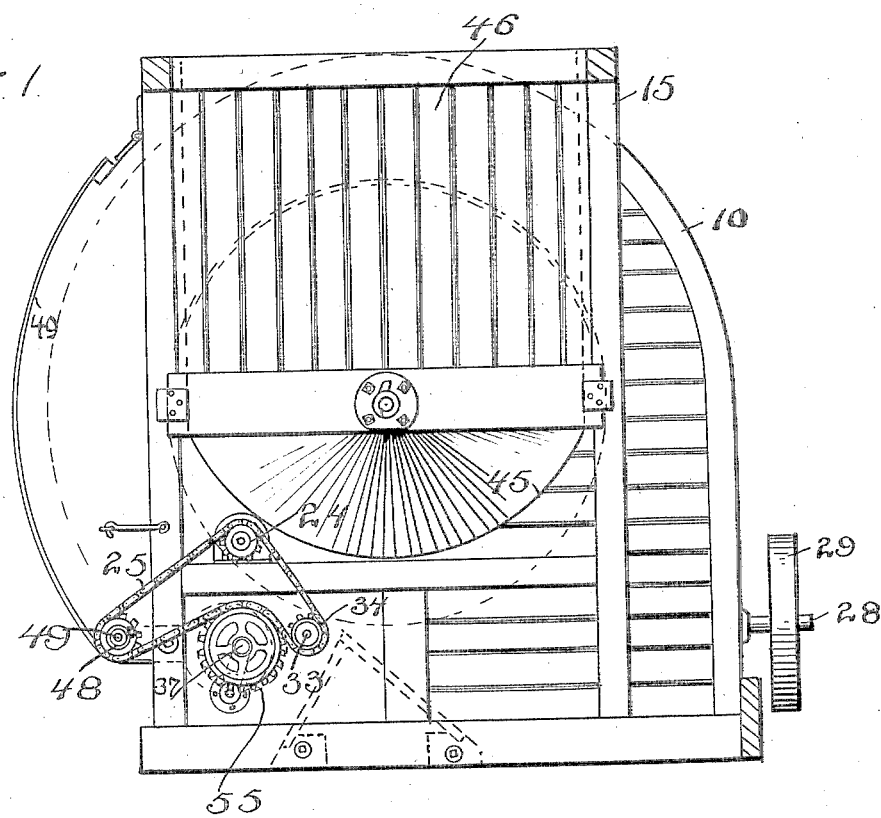
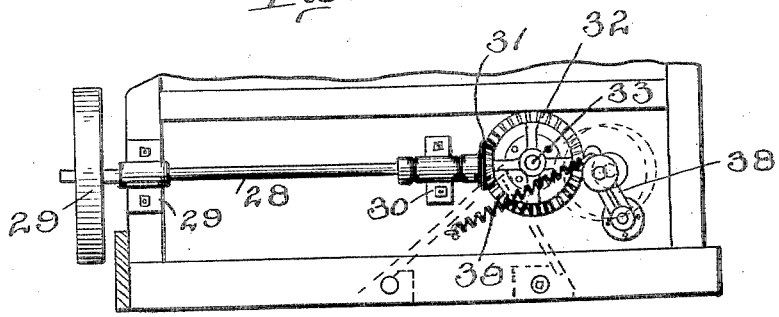

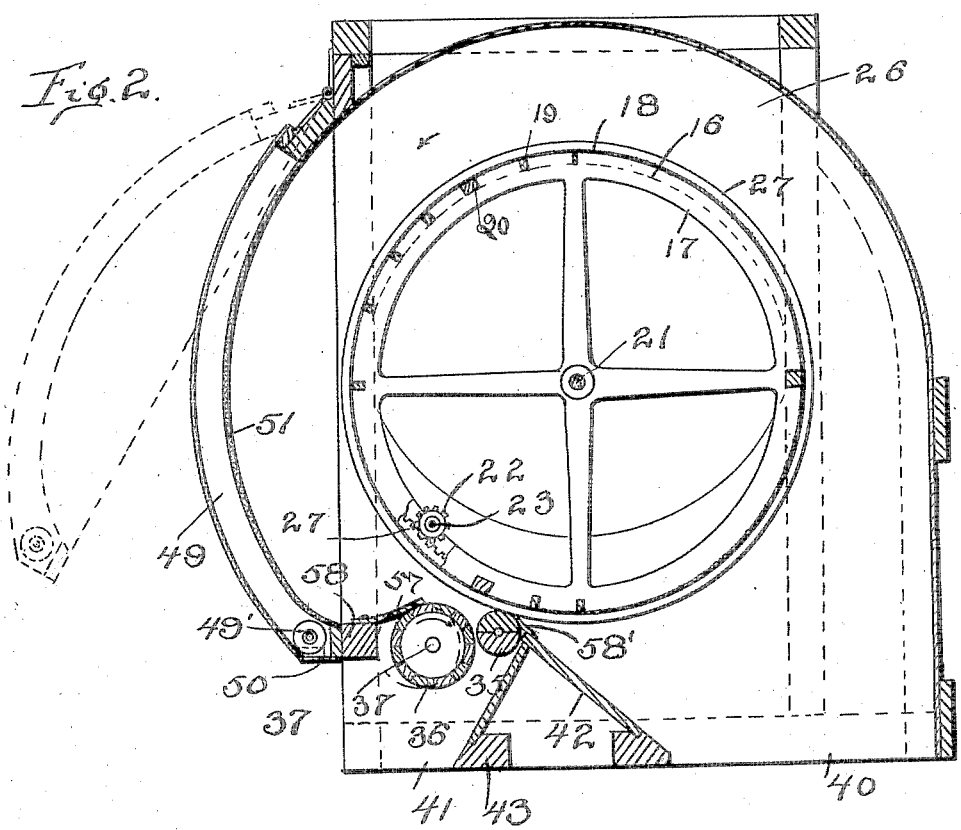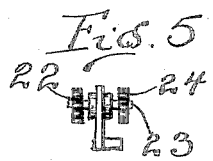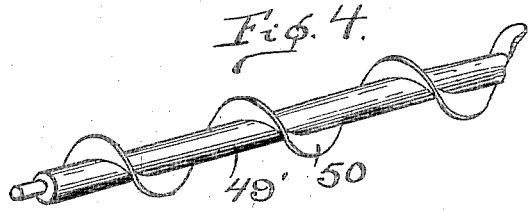

UNITED STATES PATENT OFFICE.

THADDEUS STOW GRIMES, OF COLUMBUS, GEORGIA, ASSIGNOR TO LUMMUS COTTON GIN COMPANY, OF COLUMBUS, GEORGIA, A CORPORATION OF GEORGIA.

COTTON-CONDENSER.

1,081,111.

Specification of Letters Patent. Patented Dec. 9, 1913.

Application filed June 20, 1911. Serial No. 634,373.

*To all whom it may concern:*

Be it known that I, THADDEUS S. GRIMES, a citizen of the United States, residing at Columbus, in the county of Muscogee and State of Georgia, have invented certain new and useful Improvements in Cotton-Condensers; and I do hereby declare the following to be a full, clear, and exact description of the invention, such as will enable others skilled in the art to which it appertains to make and use the same.

This invention relates to cotton condensers of the single drum type, and the object is to provide an improved construction in which the cotton is brought into the condenser at a tangent with the circumference of the drum, then blown by means of an air current of high velocity through an unobstructed passage around substantially the entire drum with only a small portion coming into contact with the latter, and then carried between rollers rotated at slow speed as compared with the velocity of the aforesaid air current, thus forming a thick and strong bat.

Further objects will appear from the following description and they include the provision of novel cleaning means mounted adjacent to the rollers at the outlet, and the provision of means for preventing the escape of air or cotton at certain points.

In the accompanying drawings forming a part of this application: Figure 1 is a view of the device in end elevation. Fig. 2 is a view in vertical transverse section. Fig. 3 is a view in elevation of a portion of the driving mechanism. Fig. 4 is a detail view of a conveyer mounted within a hinged dust receptacle forming a part of the casing. Fig. 5 is a detail view showing the pinion for driving the condenser drum.

In carrying out my invention, I provide a suitable casing 10, of which the framework 15 forms a part, and within this casing I mount a drum 16 formed with heads 17 suitably spaced apart and surrounded by a wire screen. The screen is shown at 18 and is passed around metallic slats 19 and secured to wooden slats 20. The drum is mounted on a shaft 21 and is driven by means of a pinion 22 mounted on short shaft 23, which also carries a pinion 24, the teeth of which are engaged by a sprocket chain 25. The drum 16 is spaced slightly from the side walls 26 of the casing, and the cotton is prevented from being blown through the space between the drum and the end walls by means of a packing material 27, one edge of which rests upon the circumference of the drum at the end portion, and the other edge against the said side walls 26.

Within one end of the drum is a rack 27' engaged by the aforesaid pinion 22 for the purpose of rotating the drum. The driving shaft is shown in Fig. 3 and is designated by 28, and carries at one end a pulley 29, which is driven by a belt not shown. The bearings for the shaft 28 are shown at 29 and 30, and a beveled gear 31 is carried by the end of shaft 28 opposite to pulley 29 and engages a larger beveled gear 32 secured to shaft 33. The shaft last mentioned carries on its opposite end a sprocket wheel 34, around which a chain 25 passes. Shaft 33 carries a roller 35 forming a part of the mechanism for receiving the cotton from the condenser and discharging it. A second roller 36 is mounted adjacent to roller 35 and is carried by a shaft 37, the ends of which are supported by pivotally mounted and slotted arms 38 shown in Fig. 3. One of said arms 38 is connected at its free end to a coiled spring 39, secured at one end to the casing and serving to aid in holding roller 36 in the proper position. The opposite end of the roller is held in position by the chain 25, and it will be observed that the construction described permits of the automatic positioning of roller 36 to correspond with a bat having a given thickness.

The partition between the inlet for the lint and the outlet comprises a plurality of partition members. Roller 35 is the upper partition member and V-shaped member 42 mounted on transverse bars 43 constitutes the lower member of the partition. It will be observed that as a result of this construction the roller 35 in connection with strip 58' on partition 42 aids in preventing the passage of air or lint laterally from the inlet immediately to the outlet when the device is in operation. The space between the rollers and the drum is then filled with the main body of lint being discharged.

It will be observed that the inlet 40 is so positioned that the cotton received from the gins enters the casing at a tangent to the circumference of the drum. The result of this construction is that a major portion of the stream of cotton is carried through the casing without coming into contact with the drum. The high velocity of the air current as compared with the speed of rollers 35 and 36 serves to produce a strong, thick bat, the cotton moving through the condenser at comparatively high speed and being discharged at a slower rate. A considerable quantity of dust will be driven through the wire screen 18 of the drum by the force of the air current and will emerge at the ends of the drum through a portion 45 of the casing, which is approximately semi-conical in configuration, thence passing to the upper end portion 46 of the casing and to the outlet flue not shown in the present drawings.

Referring again to the sprocket chain 25 and to the several rollers and sprocket wheel forming a part of the operating mechanism, it will be observed upon an examination of Fig. 1 that the said chain 25 passes around a sprocket wheel 48 which is mounted upon shaft 49' passing lengthwise through the lower portion of the hinged section 49 of the casing. Shaft 49' carries flanges 50 and constitutes a conveyer, which serves to carry the dust and trash accumulating in said hinged section 49 out through an opening 50 in the end of hinged section 49.

The inner wall of the hinged section comprises a screen 51 which may have the same curvature as that of the main wall of the casing and be spaced from the surface of the drum an equal distance with the remainder of the said wall. The chain 25 passes around sprocket wheels 24, 34 and 48 and bears against sprocket wheel 55 carried by shaft 37.

A strip of flexible material 57 is carried on member 58 of the framework and extends over roller 36, for the purpose of forming a substantially air tight connection, regardless of the position of the roller. A similar strip 58' projects over roller 35.

The sprockets of rollers 35 and 36 are so proportioned that the latter are given the same peripheral speed.

The condenser herein described possesses several important advantages which will be briefly referred to: Only a limited portion of the cotton lint adheres to and is controlled directly by the drum, the remainder passing around the drum and outwardly between the rollers, without encountering obstructions in its path. The air is thus permitted to pass through the drum more readily (the surface of the latter being comparatively free), and the drum and rollers may be rotated at a slower speed than would otherwise be necessary. This slower speed produces a thicker bat.

By positioning the inlet and outlet on the same side of the drum and adjacent to one another (being separated only by the roller constituting the upper portion of the partition wall), approximately the entire circumference of the drum is made use of. Should the rollers fail to take out all of the lint cotton, and allow some of it to be carried beyond the smaller roller, it will not be lost by being blown out through the dust flues, as in certain other machines, but it will be brought around a second time to the rollers 35 and 36, where it will be drawn out with the remainder of the cotton.

The dust receptacle within the hinged portion of the casing is located at a point adjacent to the rollers at the outlet, thus serving an important cleaning function, for the reason that the centrifugal action has, by the time the lint reaches the point mentioned, caused the dust to pass to the outer portion of the stream, in position to be discharged through screen 51 into the receptacle provided for the purpose.

What I claim is:

1. In a device of the class described, a casing, a drum having perforate walls arranged to rotate therein, an inlet for introducing air and cotton at a tangent with the drum, a lint outlet extending in substantially the same direction as the inlet and alongside of the latter and rollers on opposite sides of the lint outlet of the casing, one of said rollers being located between the inlet of the casing and the other roller, and between said outlet and the drum, and serving in part as a partition member between said inlet and lint outlet.

2. In a device of the class described, a casing, a drum having perforate walls arranged to rotate therein, an inlet and a lint outlet for said casing arranged to permit the unobstructed passage of the main stream of lint about the drum without coming into contact therewith, and rollers on opposite sides of the lint outlet of the casing, one of said rollers being located between the inlet of the casing and the other roller, and between said outlet and the drum, and serving in part as a partition member between said inlet and lint outlet.

3. In a device of the class described, a casing, a drum having perforate walls arranged to rotate therein, an inlet and a lint outlet for the casing, rollers on opposite sides of the lint outlet of the casing, one of said rollers being located between the inlet of the casing and the other roller, and between said outlet and the drum, and serving in part as a partition member between said inlet and lint outlet, and a cleaning device constituting a part of the casing and arranged adjacent to said rollers.

4. In a device of the class described, a casing, a drum having perforate walls mounted therein, an inlet and a lint outlet for said casing, rollers on opposite sides of the lint outlet of the casing, one of said rollers being located between the inlet of the casing and the other roller, and between said outlet and the drum, and serving in part as a partition member between said inlet and lint outlet, and the other of said rollers being mounted to swing in a direction transversely of its axis.

5. In a device of the class described, a casing, a drum having perforate walls arranged to rotate therein, an inlet and an outlet for said casing, a plurality of rollers arranged adjacent to the outlet, one of said rollers constituting a portion of the partition wall of the outlet, the other of said rollers being arranged to swing laterally with reference to the adjacent roller, a pinion for driving the drum, a pinion carried by the shaft of each of the rollers and means for driving all of said pinions.

6. In a device of the class described, a casing, a drum mounted to rotate therein, an inlet and an outlet for said casing, a dust receptacle, the inner wall of which constitutes a continuation of the walls of the casing and is provided with apertures, means for hinging said dust receptacle to the casing proper, a conveying device within the dust receptacle, a plurality of devices for discharging a cotton bat, and means for driving said conveying device, the aforesaid drum and the bat discharging devices.

7. In a device of the class described, a casing, a drum arranged to rotate therein, a stationary partition wall within the casing, said casing being provided with an inlet and an outlet, a roller mounted adjacent to the upper end of said partition and between the latter and drum, means for preventing the escape of air between the roller and the stationary portion of the partition, a second roller adjacent to the roller first mentioned, coöperating therewith in the formation and discharge of a cotton bat and having a movement in a direction at right angles to its main axis, a dust receptacle within the wall of the casing and adjacent to said second roller, a conveying device within the said receptacle, and means for driving said rollers, the aforesaid drum and the conveying means.

8. In a device of the class described, a casing, a drum mounted to rotate therein, a stationary partition member mounted within the casing, said casing being formed with an inlet and an outlet on opposite sides of the partition member, a rotating device adjacent to the partition member and constituting a portion of the separating means between the inlet and outlet, a second roller adjacent to the roller first mentioned and having a greater diameter, a pinion for rotating the drum, and means for driving said pinion and said rollers, whereby the latter have imparted thereto a corresponding peripheral speed.

In testimony whereof I affix my signature in presence of two witnesses.

THADDEUS STOW GRIMES.

Witnesses:
GEORGE H. FORD,
K. ROSCOE LUMMUS.